(12) United States Patent
Patton (10) Patent No.: US 11,056,333 B2
(45) Date of Patent: Jul. 6, 2021

(54) SPECTROMETRY METHOD AND DEVICE FOR DETECTING IONISING RADIATION FOR THE IMPLEMENTATION THEREOF

(71) Applicant: ICOHUP, Limoges (FR)

(72) Inventor: Gaël Patton, Saint Just le Martel (FR)

(73) Assignee: ICOHUP, Limoges (FR)

( * ) Notice: Subject to any disclaimer, the term of this patent is extended or adjusted under 35 U.S.C. 154(b) by 0 days.

(21) Appl. No.: 16/552,113

(22) Filed: Aug. 27, 2019

(65) Prior Publication Data
US 2020/0075309 A1    Mar. 5, 2020

(30) Foreign Application Priority Data
Aug. 28, 2018  (FR) ...................................... 18 57708

(51) Int. Cl.
| H01J 49/44 | (2006.01) |
| G01T 1/20 | (2006.01) |
| G01T 1/40 | (2006.01) |
| G01T 7/00 | (2006.01) |

(52) U.S. Cl.
CPC ............ *H01J 49/44* (2013.01); *G01T 1/2018* (2013.01); *G01T 1/40* (2013.01); *G01T 7/005* (2013.01); *G01T 1/2002* (2013.01)

(58) Field of Classification Search
CPC ........... H01J 49/44; G01T 1/2018; G01T 1/40
See application file for complete search history.

(56) References Cited

U.S. PATENT DOCUMENTS

| 7,065,473 B2 | 6/2006 | Warburton et al. |
| 2011/0101232 A1 | 5/2011 | Stein et al. |
| 2018/0113160 A1* | 4/2018 | Warburton ............ G01S 7/4866 |

FOREIGN PATENT DOCUMENTS

FR          3020470 A1     10/2015

OTHER PUBLICATIONS

French Search Report, dated Jul. 2, 2019, from corresponding French patent application No. 1857708.

* cited by examiner

*Primary Examiner* — Hugh Maupin
(74) *Attorney, Agent, or Firm* — Nixon & Vanderhye (57) ABSTRACT

Disclosed is a spectrometry method including: for at least one ionizing-radiation energy $E_i$, obtaining, for each energy $E_i$, a curve of the number of photons detected, during a measurement interval, as a function of time, by spectrometer; b) for each curve, computing a ratio of the number of photons detected defined and separate time periods to obtain, for each ionizing-radiation energy $E_i$, a number $a_i$, or for each curve, acquiring one or more fitting parameters $PAJ_i$ by making a fit to the corresponding curve with a fitting function; and comparing each number $a_i$ or each fitting parameter or set of fitting parameters $PAJ_i$ with reference constants $a_i$ or, respectively, with reference fitting parameters $PAJ_i$ associated with reference energies $E_i$ to determine, for each number $a_i$ or each fitting parameter or set of fitting parameters $PAJ_i$, reference energy $E_i$ of the ionizing radiation for which the corresponding curve was measured.

20 Claims, 4 Drawing Sheets

SPECTROMETRY METHOD AND DEVICE FOR DETECTING IONISING RADIATION FOR THE IMPLEMENTATION THEREOF

TECHNICAL FIELD

The present invention relates to a spectrometry method for detecting and characterizing ionising radiation.

It also relates to a method for calibrating a spectrometer and to a method for increasing the spectral sensitivity of a spectrometer implementing such a spectrometry method.

It further relates to a device for detecting radiation for implementing this method.

PRIOR ART

In many fields, it is known to use ionising-radiation detectors to detect radiation emitted by a radioactive source, in a given environment.

Purely by way of illustration, the information delivered by these detectors may be used in zones around nuclear power plants, on industrial sites, in places where illicit trafficking of radioactive materials is counteracted, or more simply to search for isolated sources of radiation.

Certain ionising-radiation detectors are at the present time capable of measuring a radioactivity level and of identifying the source of this radiation using a measurement of the distribution of the energy of the radiation (spectrometry).

However, ionising-radiation spectrometers that employ the scintillation principle have been observed to be subject to detection drift and to ageing of the various constituent elements: photodetector, amplifier, scintillator, etc.

In particular, ionising radiation may induce structural defects in the body of the scintillator, which are then the origin of alterations, or artefacts, that affect to a greater or lesser extent the measurements carried out.

Likewise, certain components of these spectrometers may even be sensitive to ambient humidity and/or to temperature.

To characterize ionising radiation, these spectrometers therefore require frequent calibration.

Provision is generally made to return these spectrometers to the factory that produced them or to send them to a specialized company so that a specialized technician can calibrate them.

Although effective, such an operation however remains very expensive for the user.

It is also known to integrate a standard source that emits a reference line into a spectrometer in order to ensure a regular recalibration of the latter.

However, such a method is complex and very constraining for the user from the radioprotection point of view.

Furthermore, the presence of such a standard source, also called a reference source, requires a protective screen to be placed in the spectrometer, which may mask a portion of the field of detection of the ionising radiation.

Moreover, the spectral sensitivity, also called the energy resolution, of a scintillator is limited to a few percent, generally from three (3) to twelve (12) percent depending on the scintillator.

If its spectral sensitivity is insufficient, the measurements taken by a spectrometer may prove to be imprecise, and therefore unusable when it is a question of distinguishing spectrally neighbouring emissions.

Thus, an improvement of a few percent could drastically improve the capacity of any detector to discriminate between radioactive elements.

There is therefore a pressing need for a spectrometry method having an original design that would allow the performance of a spectrometer with respect to detection of ionising radiation to be improved.

SUBJECT OF THE INVENTION

The present invention aims to mitigate the drawbacks of the prior art by providing a spectrometry method and a device for detecting ionising radiation that are simple in their design and in their operating mode, reliable and economical, and that allow the capacity of a spectrometer to be improved.

The present invention also relates to a method for calibrating a spectrometer that permits self-calibration of the spectrometer in real time without addition of one or more standard sources and that thus allows any observed measurement drift to be corrected.

The present invention also relates to a method for increasing the spectral sensitivity of a spectrometer with a view to ensuring a better differentiation of radioisotopes.

The present invention also relates to an economical and compact ionising-radiation detector for implementing these methods.

DESCRIPTION OF THE INVENTION

To this end, the invention relates to a spectrometry method, in which the following steps are carried out:

a) for at least one ionising-radiation energy $E_i$, obtaining, for each energy $E_i$, a curve of the number of photons detected, during a measurement interval, as a function of time, by means of a spectrometer, b) for each curve thus obtained, computing a ratio of the total number of photons detected in at least two defined and separate time periods in order to obtain, for each ionising-radiation energy $E_i$, a number $a_i$, or for each curve thus obtained, acquiring one or more fitting parameters $PAJ_i$ by making a fit to said corresponding curve with a fitting function, c) comparing each number $a_i$ or each fitting parameter or set of fitting parameters $PAJ_i$ thus obtained with reference constants $a_i(REF)$ or, respectively, with reference fitting parameters $PAJ_i(REF)$ associated with reference energies $E_i(REF)$ in order to determine, for each number $a_i$ or each fitting parameter or set of fitting parameters $PAJ_i$, the reference energy $E_i(REF)$ of the ionising radiation for which said corresponding curve was measured.

The present method is applicable to the measurement of alpha (α), beta (β) or gamma (γ) radiation, x-rays or neutron (n) radiation or even any other type of ionising radiation, the spectral band of analysis of the spectrometer depending on the scintillator used, on the detection geometry and on the electronics used.

Below, by "event" what is meant is an interaction between an incident ionising particle and the scintillator. Each event results in the emission of scintillation photons by the scintillator. This photon emission follows a curve of scintillation decay over time. In step a), for each incident-ionising-radiation energy, or excitation energy, a two-dimensional curve or graphical representation (amplitude as a function of time) called the time distribution, or also called the scintillation decay, is obtained.

In step b) the number $a_i$ may be obtained via a simple ratio of two defined time periods $(T_1/T_2)$ or result from a more complex computation such as $(T_1+T_3)/T_2$ or $(T_1 \times \exp(T_3))/T_2$.

In various scintillators, this scintillation-decay curve may be described by a mono-exponential function, multi-exponential function or non-exponential function. Thus, and alternatively, step b) of the spectrometry method may consist in fitting each scintillation-decay curve, or section of scintillation-decay curve, obtained for a radiation energy $E_i$ with a fitting function, which will be chosen from a mono-exponential fitting function, a multi-exponential fitting function, or even a non-exponential fitting function such as a polynomial function.

In step c), when the number $a_i$ is equal to the constant $a_i(REF)$ or when the or the set of parameters $PAJ_i$ are equal to the reference parameter or parameters $PAJ_i(REF)$, the ionising-radiation energy $E_i$ for which the corresponding curve was obtained in step a) with the scintillation spectrometer is equal to the associated reference $E_i(REF)$.

In step b), the time periods are identical for all the curves. Optionally, they may each change depending on the type of particle to be detected and they necessarily change depending on the type of scintillator used.

Such a method advantageously permits the spectrometer to be calibrated in real time or even continuously. It is thus no longer necessary to carry out maintenance, this permitting both time and money to be saved.

The higher the number of measured events, the more relevant the calibration will be.

In various particular embodiments of this method, each having particular advantages and many technically possible combinations:

in step a), curves are obtained for at least two different ionising-radiation energies $E_i$.

in step b), said fit is obtained via a multi-exponential fitting function.

Thus, a set of fitting parameters $PAJ_i$ is obtained for each curve.

said spectrometer comprises a scintillator coupled to a photodetector, and, in step b), said time periods are chosen so as to maximize the difference between the numbers $a_i$ for two different energies $E_i$.

Purely by way of illustration, at least one of said time periods corresponds solely to a decay time, i.e. to a decrease in the number of photons detected for the interaction of the ionising radiation with this scintillator.

For example, the other of said time periods contains the peak in the number of photons detected for the interaction of the ionising radiation with said scintillator.

a scintillator the scintillation light yield of which as a function of ionising-radiation energy $E_i$ has a non-proportionality higher than 2% of variation per order of magnitude of the energy of the incident radiation, which for example ranges from 10 keV to 100 keV or from 100 keV to 1000 keV, is used in said spectrometer.

The present invention also relates to a method for calibrating a spectrometer.

According to the invention, a spectrometry method such as described above is used, and the following additional steps are carried out:

d) comparing said reference ionising-radiation energies $E_i(REF)$ determined in step c) with the corresponding energies $E_i(mes)$ measured by said spectrometer in an energy spectrum of the ionising radiation, in order to obtain an error value associated with each ionising-radiation energy measurement $E_i(mes)$, said error value being a measurement of a discrepancy between the energy $E_i(mes)$ measured by said spectrometer and the corresponding reference energy $E_i(REF)$ determined in step c), and e) when a plurality of error values are nonzero and in absolute value higher than threshold values, determining an energy correction to be made permanently to each energy $E_i(mes)$ measured by the spectrometer.

Of course, this correction is made only when the error values each exceed a threshold value beyond which the spectrometer may be considered to require a recalibration.

Advantageously, this calibrating method aims to continually correct drift in the spectrometer by comparing the amplitude of the scintillation events and the time response, the terms of which will have been computed using one of the two methods described in step b) of the spectrometry method.

The reference is the time distribution, or scintillation decay, because the latter is advantageously not subject to variations such as those that are observed for an amplitude measurement.

Such a calibrating method ensures a high degree of precision in the calibration of the spectrometer. Such a calibrating method privileges a statistical approach, i.e. a high number of events.

The present invention also relates to a method for increasing the spectral sensitivity of a spectrometer.

According to the invention, a spectrometry method such as described above is used and, for each event measured by said spectrometer, the following additional steps are carried out:

d) determining the difference between the energy $E_i(mes)$ measured by said spectrometer and said corresponding reference energy $E_i(REF)$ determined in step c) in order to obtain an energy-discrepancy value for said event, e) comparing the absolute value of this energy discrepancy with a preset threshold value called the event acceptability threshold value, and f) if this absolute value is lower than or equal to this threshold value, then counting this event in the creation of a spectrum of the number of events measured by the spectrometer as a function of the energy $E_i(REF)$ of the ionising radiation, and if this absolute value is higher than this threshold value, then discarding the event in question, then obtaining a spectrum of the total number of events measured for each reference energy $E_i(REF)$.

It will be noted that spectral sensitivity is defined by the amplitude distribution of the events forming a photoelectric peak in the gamma spectrum. This peak corresponds to scintillation events for which all of the energy of the incident ionising radiation was deposited. This energy may be deposited in a single interaction between this ionising radiation and the scintillator, which type of interaction is called a photoelectric interaction, or during a plurality of interactions (interaction via the Compton effect followed by a photoelectric interaction of the scattered photon). It is in particular events composed of a plurality of Compton interactions that decrease the spectral sensitivity of the spectrometer.

It is advantageously proposed, in this method, to identify events that correspond to single interactions in order to increase the spectral sensitivity of the spectrometer. Once these events have been detected, provision is then made:

a) to weight them in order to give them more weight in the overall spectrum, or b) to trace a clear curve including solely these events.

According to one embodiment of the method of the invention, the spectrum thus obtained is used to identify the ionising radiation corresponding to each reference energy $E_i(REF)$ and, optionally, to display the nature of said corresponding ionising radiation.

Such a method for increasing the spectral sensitivity of a spectrometer ensures the resolution of this spectrometer is greatly increased.

The present invention further relates to a computer-program product that in particular is stored on a computer-readable medium or that is implemented in the form of a signal, wherein the computer-program product contains instructions that, when it is loaded into a memory of a suitable computer and is executed by a computer, make it so that this computer implements at least certain steps of the spectrometry method such as described above, or a calibrating method such as described above or a method for increasing spectral sensitivity such as described above.

Purely by way of illustration, this computer may be a microprocessor such as an on-board microprocessor, i.e. one integrated into a portable device. Alternatively, it may even be a question of a field-programmable gate array (FPGA).

This computer may also be a fixed or movable workstation.

The present invention also relates to a device for detecting ionising radiation comprising a processing unit including a microprocessor and a data-storage unit, said storage unit containing a data library containing data on ionising radiation, said detecting device including a spectrometer including at least one scintillator coupled to a photodetector.

According to the invention, this detecting device comprises a set of software instructions by virtue of which the device is able to control said spectrometer, and to detect and identify the ionising radiation interacting with said scintillator, said software instructions belonging to said computer program such as described above.

According to one embodiment of the device of the invention, this device comprises a portable housing, this housing being provided with an aperture for detecting ionising radiation, said scintillator having a pointing axis and being arranged in the housing so that its pointing axis is oriented toward said aperture.

Advantageously, this detecting device being devoid of standard source, provision is not made for a protective screen in the housing and the detecting device has a wide field of detection.

According to another embodiment of the device of the invention, said photodetector comprises a measuring module configured to convert an electrical signal emitted by said photodetector following the detection of a photon and proportional to the number of visible photons detected by the photodetector, into a digital signal representative of the energy of the measured photon.

BRIEF DESCRIPTION OF THE DRAWINGS

Other advantages, aims and particular features of the present invention will become apparent from the following completely nonlimiting description that is given by way of explanation with reference to the appended drawings, in which.

DESCRIPTION OF THE EMBODIMENTS

The drawings and description below contain, for the most part, elements of certain character. They will therefore possibly not only serve to better understand the present invention, but also contribute to the definition thereof, where appropriate.

Firstly, it will be noted that the figures are not to scale.

Figure 1:
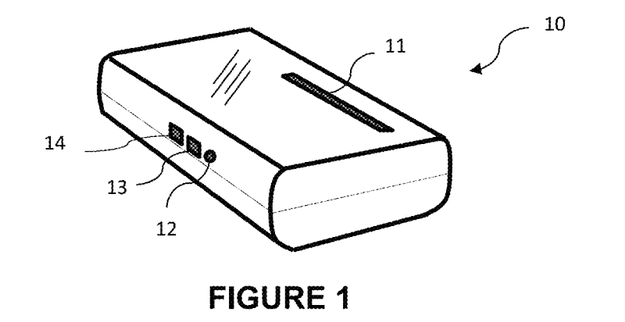
FIG. 1 is a perspective view of a device for detecting ionising radiation according to one particular embodiment of the present invention.
Figure 2:
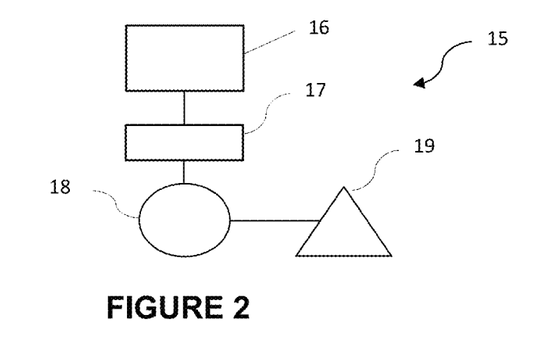
FIG. 2 is a schematic representation of the components of the device for detecting ionising radiation of FIG. 1, which components are placed in the housing of said device.

A detector of ionising radiation according to one particular embodiment of the present invention will now be described with reference to FIGS. 1 and 2.

Because of its compactness and its ease of use, such a detector 10 is particularly advantageous for monitoring an environment and optionally a contaminated object in order to avert an immediate danger in case of measurement of high concentrations.

This detector 10 includes a detector body provided with an entrance window 11 in its upper face, this window 11 being intended to pass particles to be detected. As known, this entrance window 11 may include a film that is opaque to light, such as a film of MYLAR® or any other thin film that is opaque to the wavelengths of light detectable by the photodetector.

On one of its lateral edges, it also comprises an indicator light allowing the operating state of the detector to be displayed (low battery, turned on or turned off).

It also includes a connector 13 such as a USB port in order to allow the detector to be connected to a computer with a view to loading or downloading data and/or computer programs, and an on/off button 14.

Of course, such a detector 10 could also include a communication unit for receiving and transmitting data.

Advantageously, this communication unit could be a wireless communication module configured to communicate using one of the following protocols: Sigfox, LoRa or even ZigBee. In other words, it is a question of a low-power wireless communication module allowing the battery with which the detector is equipped to be economized. It could even comprise a wireless communication module such as a Bluetooth communication module in order to allow data or messages to be routed when a lack of Sigfox or LoRaWAN coverage is detected.

Of course, it could also be a question of a wireless communication module based on one of the following protocols: IEEE 802.11 b/g/n (Wi-Fi), IEEE 802.15.1 (Bluetooth), or 2G, 3G, 4G, 5G or even GSM or GPRS.

It could even include a wireless positioning means such as a GPS receiver in order to allow its position to be determined, and a storage unit for storing timestamped data.

Each of these data could then comprise a position and a time at which this position was acquired by the GPS receiver, and whether or not ionising radiation was detected.

The body of the detector is here made entirely of a fine wood such as ash, but it could also be made from another material such as a hard plastic.

The interior walls of this detector body are opaque in order to block outside light.

A spectrometer 15 allowing particles to be detected, the latter to be counted and energy spectra to be obtained is placed in the interior volume bounded by the detector body 10.

This spectrometer thus comprises a scintillator 16 for simultaneously measuring α and β radiation. This scintillator 16 is here formed by a stack of layers of various inorganic and organic scintillator materials.

This scintillator 16 is an elongate body, such as a strip, placed facing the window in order to receive the particles that pass through this entrance window 11. The dimensions of the scintillator are, purely by way of illustration, 6*6*50 mm. They could equally well be 6*6*100 mm or even 30*30*30 mm.

A photodetector 17 is optically coupled to this scintillator 16 and includes a measuring module 18 configured to convert an electrical signal emitted by this photodetector 17, following the detection of a photon, and proportional to the number of visible photons detected by the photodetector, into a digital signal representative of the energy of the measured photon. This photodetector 17 therefore has a sensitivity appropriate for the emission wavelengths of the scintillator. It is here a question of a silicon-photomultiplier (or SiPM) sensor, but it could also be a question of conventional photomultiplier tubes or of photodiodes.

It further comprises a processing unit 19 including a microprocessor, or field-programmable gate array (FPGA), and a data-storage unit, this storage unit containing a data library containing data on ionising radiation (energies, etc.).

This detector 10 comprises a set of software instructions by virtue of which it is able to control the spectrometer, and to detect and identify the ionising radiation interacting with said scintillator, said software instructions belonging to a computer program allowing at least certain of the following steps of the method to be implemented:

a) for at least one ionising-radiation energy $E_i$, obtaining, for each energy $E_i$, a curve of the number of photons detected, during a measurement interval, as a function of time, by means of a spectrometer, b) for each curve thus obtained, computing a ratio of the total number of photons detected in at least two defined and separate time periods in order to obtain, for each ionising-radiation energy $E_i$, a number $a_i$, or for each curve thus obtained, acquiring one or more fitting parameters $PAJ_i$ by making a fit to said corresponding curve with a fitting function, c) comparing each number $a_i$ or each fitting parameter or set of fitting parameters $PAJ_i$ thus obtained with reference constants $a_i(REF)$ or, respectively, with reference fitting parameters $PAJ_i(REF)$ associated with reference energies $E_i(REF)$ in order to determine, for each number $a_i$ or each fitting parameter or set of fitting parameters $PAJ_i$, the reference energy $E_i(REF)$ of the ionising radiation for which said corresponding curve was measured.

Figure 3:
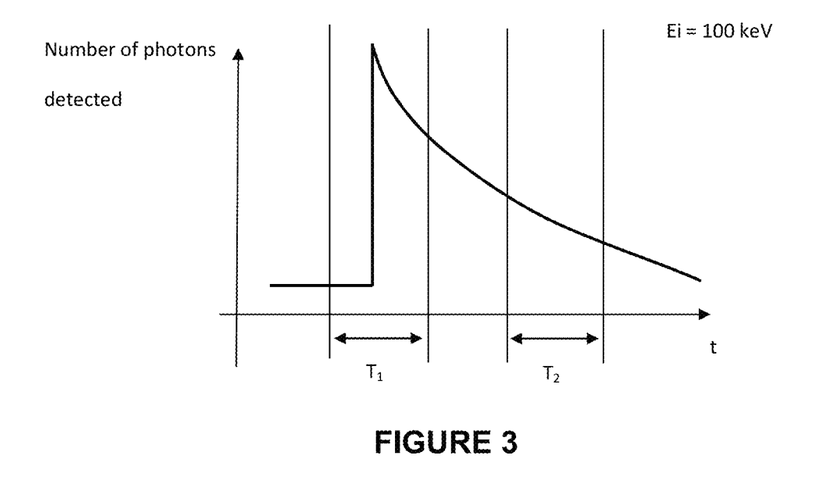
FIG. 3 is a so-called scintillation-decay curve obtained for an ionising-radiation energy $E_i$ by means of a spectrometer according to one embodiment of the method or the invention, two separate time periods being illustrated on this curve.

FIG. 3 shows an example of a curve of the type called a scintillation-decay curve, which example was obtained, in step a), with ionising radiation of given energy incident on the scintillator. From this scintillation-decay curve, the microprocessor, or FPGA, defines two separate time periods $T_1$ and $T_2$. For each of these time periods, it then integrates the number of photons emitted by the scintillator, i.e. what is also referred to as the amount of light, then computes the ratio of the total number of photons detected in the period $T_1$ to the total number of photons detected in the period $T_1$, which provides a number an associated with the excitation energy (step b).

In step c), it compares the number a thus obtained with reference constants a(REF), b(REF), c(REF), etc. each associated with a reference energy E(REF) in order to identify the reference energy E(REF) for which the number a was obtained.

This method thus allows the actual excitation energy for which the scintillation-decay curve was obtained in step a) to be very precisely identified.

Figure 4:
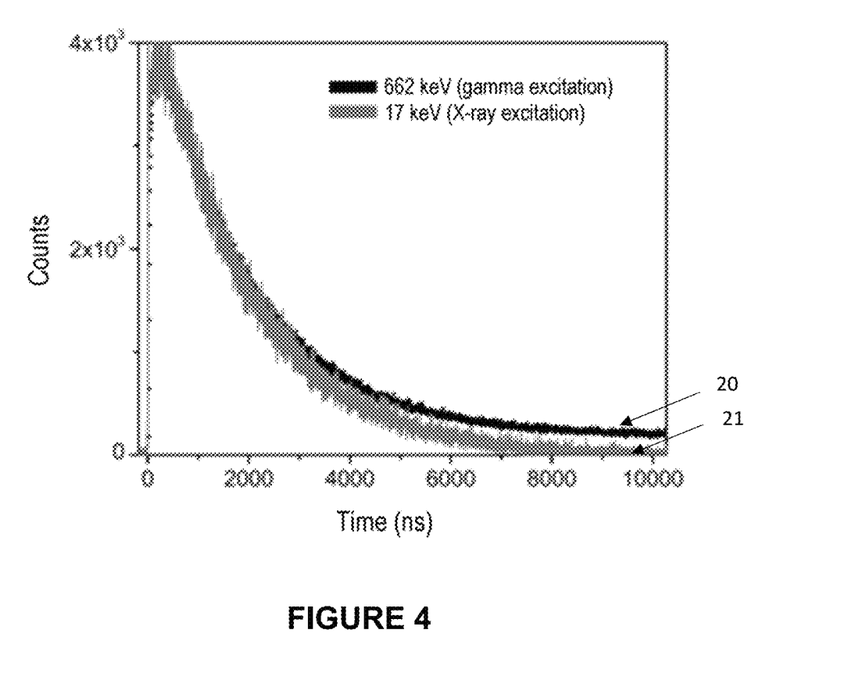
FIG. 4 is a representation of scintillation-decay curves measured with a scintillation spectrometer for two different ionising-radiation energies: lower curve 17 keV, and upper curve 662 keV.

For one implementation of the present invention, FIG. 4 shows scintillation-decay curves measured by means of a scintillation spectrometer with a scintillator made of CsI-Tl (thallium-doped cesium iodide) for two different types of ionising radiation, namely exciting x-rays of 17 keV and exciting gamma rays of 662 keV.

The upper scintillation-decay curve 20 was obtained for a gamma-radiation energy of 662 keV and the lower scintillation-decay curve 21 was obtained for an x-ray energy of 17 keV.

It may clearly be seen that the energy of the exciting radiation has an effect on the so-called "fast-to-tail ratio", which increases as the exciting energy decreases.

This change in the dynamics of the light emission is related to the variation in the density of the electronic charge produced during the interaction of each gamma particle with the material.

Figure 5:
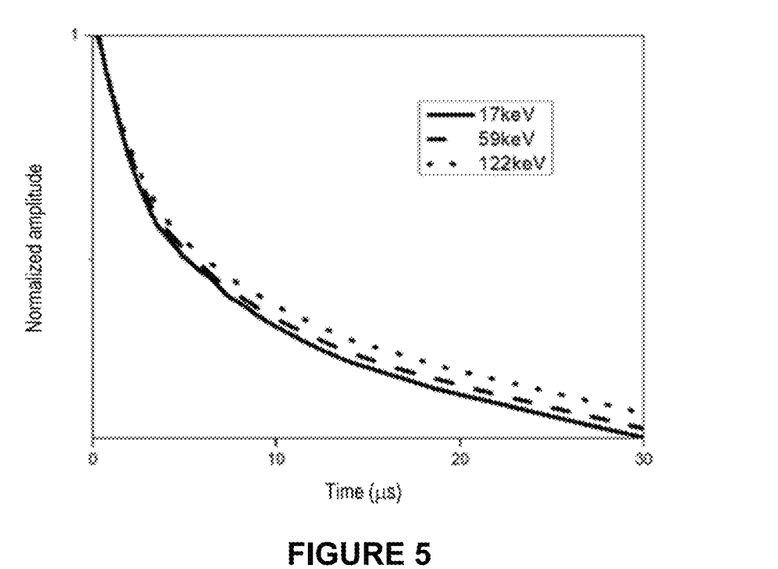
FIG. 5 illustrates a scintillation-decay-curve section obtained with a scintillation spectrometer employing an inorganic scintillator of the alkali-halide type for various ionising-radiation energies: two beams (17 keV and 59 keV) generated with atoms of Americium-241 ($^{241}$Am) and one beam generated with Cobalt-57 ($^{57}$Co)

For a second implementation of the present invention, FIG. 5 thus illustrates a scintillation-decay-curve section obtained with a scintillation spectrometer employing an inorganic scintillator of the alkali-halide type for various ionising-radiation energies: two beams (17 keV and 59 keV) generated with atoms of Americium-241 ($^{241}$Am) and one beam generated with Cobalt-57 ($^{57}$Co).

The amplitude of the measured signals has been normalized.

With these three curve sections obtained with known ionising-radiation emitters, it is possible to determine the fitting parameter $PAJ_i(REF)$/reference energy $E_i(REF)$ pairs that will subsequently be used in step c) of the method to determine the actual ionising-radiation energy for which any new scintillation-decay curve is obtained with the same scintillation spectrometer.

To do this, a double-exponential fitting function is used to fit, or even take into account, the shape of each scintillation-decay-curve section illustrated in FIG. 5.

This function is written:

$$A_1 \times e^{-t/t_1} + A_2 \times e^{-t/t_2}$$

The reference fitting parameters obtained by fitting these various curves are thus:

$A_1$ [REF]=0.41092

$t_1$ [REF]=1.7

$A_2$ [REF]=0.68106 and the parameter $t_2$ [REF], which is a variable dependent on the energy of the ionising radiation.

Figure 6:
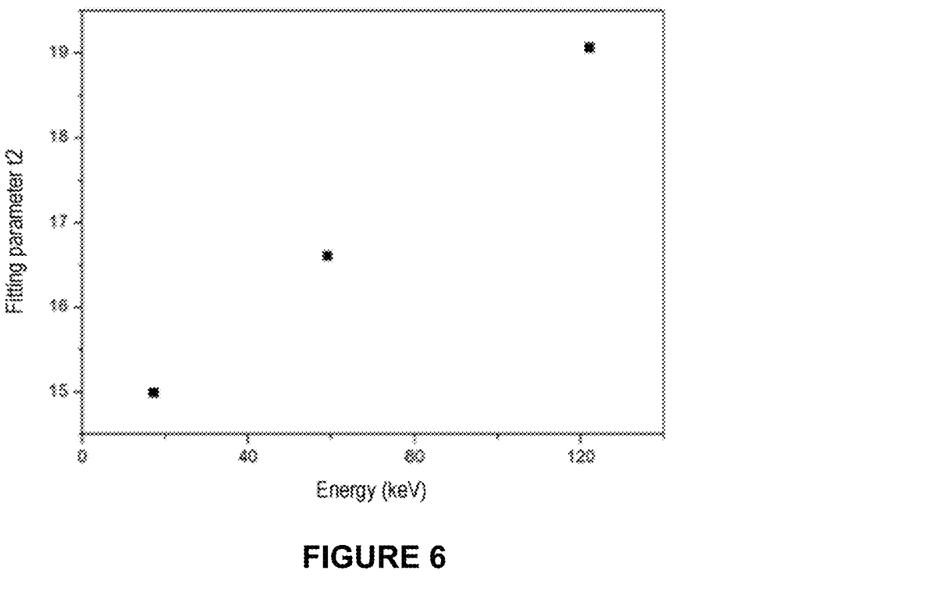
FIG. 6 shows the variation in the fitting parameter $t_2$[REF] as a function of the reference energy $E_i$(REF) in keV; this parameter resulting from a multi-exponential fit of the curves illustrated in FIG. 5.

Thus, by virtue of this reference parameter $t_2$, it is therefore possible to determine the energy of the radiation $E_i(REF)$, on the x-axis of FIG. 6, for which any entirely new scintillation-decay curve has been produced with the scintillation spectrometer.

In conclusion, since the curve shown in FIG. 6 is not subject to any calibration, it is a reference graph allowing a measurement obtained with the scintillation spectrometer to be calibrated.

Once these reference parameters and associated reference energies have been determined, for any new measurement obtained with this scintillation spectrometer, after steps a) and b) of the present method have been carried out, in step (c) the fitting parameters $(A_i, t_i)$, with i=1, 2, obtained in step b) of the method, for the measured scintillation-decay curve, are compared with the reference fitting parameters ($A_1$[REF], $A_2$[REF], $t_1$[REF], $t_2$[REF]) described above.

Matching the fitting parameters obtained in step b), for an energy $E_i$ measured by the scintillation spectrometer, to reference fitting parameters ($A_1$[REF], $A_2$[REF], $t_1$[REF], $t_2$[REF]) obtained for a reference energy $E_i(REF)$, thus allows the actual radiation energy for which the scintillation-decay curve was measured to be determined.

It is therefore possible to calibrate the scintillation spectrometer.

Very advantageously, it will be clear from the above that the one or more reference fitting parameters and the associated reference energy may be determined at any time with at least two known sources of ionising radiation.

Of course, such conclusions could also be reached not by fitting at least one section of the scintillation-decay curve with a fitting function, but by computing the ratio of the total number of photons detected in at least two defined and separate time periods of the scintillation-decay curve in order to obtain, for each ionising-radiation energy $E_i$, a number $a_i$.

In step c), comparison of the number $a_i$ with a constant $a_i(REF)$ allows the actual energy, or indeed reference energy $E_i(REF)$, of the ionising radiation for which the curve was measured by the scintillation spectrometer to be determined.

Figure 7:
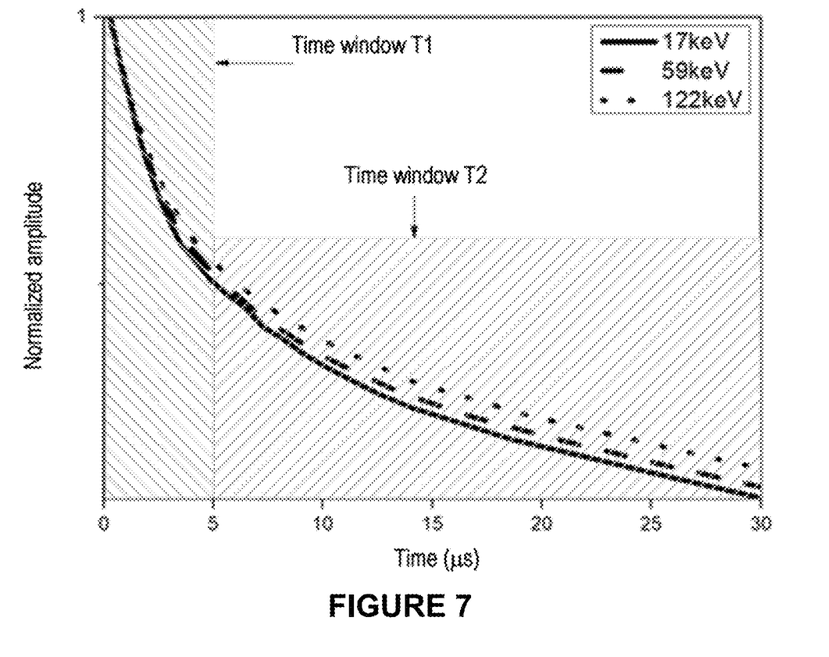
FIG. 7 shows the sections of curve shown in FIG. 5, on which sections the time windows $T_1$ and $T_2$ employed to determine the constants $a_i$ have been shown.

Thus, and such as shown in FIG. 7, in order to determine the pairs ($a_i(REF)$, $E_i(REF)$), two time windows are defined beforehand for the previously obtained scintillation-decay curves.

Generally, these time windows are typically defined by one tenth (1/10th) of the total integration duration.

In the present case, one sixth (1/6th) of the total duration of the integration has been used, which value corresponds to about three times the time constant of the first exponential computed in the preceding paragraph. This metric gives satisfactory results with this type of (alkali-halide) scintillator.

It is then possible to compute the integral of the signals in these two windows, and to plot the ratio (Integral=$T_1$/Integral $T_2$) as a function of the reference energy $E_i(REF)$.

Figure 8:
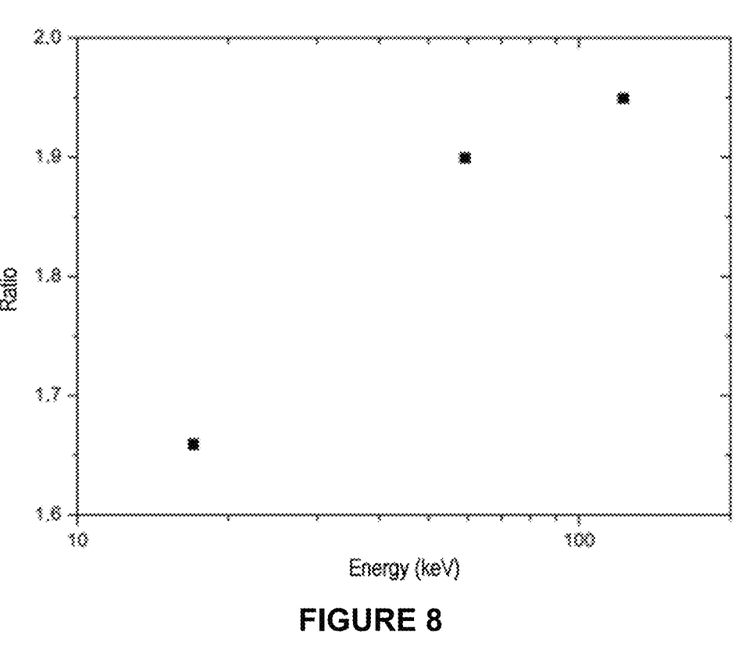
FIG. 8 is a representation of the variation in the reference constant $a_i$(REF), which is equal to the ratio (Integral $T_1$/Integral $T_2$), as a function of the reference energy $E_i$(REF).

Just as with the parameter $t_2$[REF] of the multi-exponential fit, access is thus obtained, by virtue of the plot joining the points of FIG. 8, to information on the reference energy, or actual energy, measured by the scintillation spectrometer, via a measurement of the ratio (Integral=$T_1$/Integral $T_2$), which does not depend on any calibration.

The invention claimed is:

1. A spectrometry method for detecting and characterizing ionising radiation, comprising:
    a) for at least one ionising-radiation energy $E_i$ detected by a spectrometer (15), obtaining, for each energy $E_i$, a curve of a number of photons detected, during a measurement interval, as a function of time, by means of the spectrometer (15);
    b) for each curve thus obtained, computing a ratio of a total number of photons detected in at least two defined and separate time periods in order to obtain, for each ionising-radiation energy $E_i$, a number $a_i$, or
    for each curve thus obtained, acquiring one or more fitting parameters $PAJ_i$ by making a fit to said corresponding curve with a fitting function; and
    c) comparing each number $a_i$ or each fitting parameter or set of fitting parameters $PAJ_i$ thus obtained with reference constants $a_i(REF)$ or, respectively, with reference fitting parameters $PAJ_i(REF)$ associated with reference energies $E_i(REF)$ in order to determine, for each number $a_i$ or each fitting parameter or set of fitting parameters $PAJ_i$, the reference energy $E_i(REF)$ of the ionising radiation for which said corresponding curve was measured.

2. The method according to claim 1, wherein, in step a), a curve is obtained for at least two different ionising-radiation energies $E_i$.

3. The method according to claim 1, wherein, in step b), said fit is obtained via a multi-exponential fitting function.

4. The method according to claim 1, wherein said spectrometer (15) comprises a scintillator (16) coupled to a photodetector (17), and, in step b), said time periods are chosen so as to maximize the difference between the numbers $a_i$ for two different energies $E_i$.

5. The method according to claim 1, wherein said spectrometer (15) uses a scintillator (16) wherein a yield of a scintillation light, as a function of ionising-radiation energy $E_i$, has a non-proportionality higher than or equal to 2% of variation per order of magnitude of the energy of an incident radiation.

6. A method for calibrating a spectrometer (15), wherein the spectrometry method according to claim 1 is used, and wherein the following additional steps are carried out:
    d) comparing said reference ionising-radiation energies $E_i(REF)$ determined in step c) with the corresponding energies $E_i(mes)$ measured by said spectrometer (15) in an energy spectrum of the ionising radiation, in order to obtain an error value associated with each ionising-radiation energy measurement, said error value being a measurement of a discrepancy between the energy $E_i(mes)$ measured by said spectrometer (15) and the corresponding reference energy $E_i(REF)$ determined in step c); and
    e) when a plurality of error values are nonzero and in absolute value higher than threshold values, determining an energy correction to be made permanently to each energy $E_i(mes)$ measured by the spectrometer (15).

7. A method for increasing the spectral sensitivity of a spectrometer (15), wherein the spectrometry method according to claim 1 is used, and wherein, for each event measured by said spectrometer (15), the following additional steps are carried out:
    d) determining the difference between the energy $E_i(mes)$ measured by said spectrometer (15) and said corresponding reference energy $E_i(REF)$ determined in step c) in order to obtain an energy-discrepancy value for said event;
    e) comparing the absolute value of this energy discrepancy with a preset threshold value called the acceptability threshold value; and
    f) if this absolute value is lower than or equal to this threshold value, then counting this event in the creation of a spectrum of the number of events measured by the spectrometer (15) as a function of the energy $E_i(REF)$ of the ionising radiation, and if this absolute value is higher than this threshold value, then discarding the event in question, then obtaining a spectrum of the total number of events measured for each reference energy $E_i(REF)$.

8. A non-transitory computer-readable medium on which is stored a computer program comprising instructions that, when loaded into a memory of a computer and is executed by the computer, cause the computer to perform the spectrometry method according to claim 1.

9. A device for detecting ionising radiation comprising a processing unit including a microprocessor and a data-storage unit, said storage unit containing a data library containing data on ionising radiation, said detecting device including a spectrometer (15) including at least one scintillator (16) coupled to a photodetector (17), the device comprising a set of software instructions by virtue of which the device is able to control said spectrometer (15), and to detect and identify the ionising radiation interacting with said scintillator (16), said software instructions belonging to said computer program according to claim 8.

10. The device according to claim 9, wherein said photodetector (17) comprises a measuring module configured to convert an electrical signal emitted by said photodetector (17) following the detection of a photon and proportional to the number of visible photons detected by the photodetector (17), into a digital signal representative of the energy of the measured photon.

11. The method according to claim 2, wherein, in step b), said fit is obtained via a multi-exponential fitting function.

12. The method according to claim 2, wherein said spectrometer (15) comprises a scintillator (16) coupled to a photodetector (17), and, in step b), said time periods are chosen so as to maximize the difference between the numbers $a_i$ for two different energies $E_i$.

13. The method according to claim 3, wherein said spectrometer (15) comprises a scintillator (16) coupled to a photodetector (17), and, in step b), said time periods are chosen so as to maximize the difference between the numbers $a_i$ for two different energies $E_i$.

14. The method according to claim 2, wherein said spectrometer (15) uses a scintillator (16) wherein a yield of a scintillation light, as a function of ionising-radiation energy $E_i$, has a non-proportionality higher than or equal to 2% of variation per order of magnitude of the energy of an incident radiation.

15. The method according to claim 3, wherein said spectrometer (15) uses a scintillator (16) wherein a yield of a scintillation light, as a function of ionising-radiation energy $E_i$, has a non-proportionality higher than or equal to 2% of variation per order of magnitude of the energy of an incident radiation.

16. The method according to claim 4, wherein said spectrometer (15) uses a scintillator (16) wherein a yield of a scintillation light, as a function of ionising-radiation energy $E_i$, has a non-proportionality higher than or equal to 2% of variation per order of magnitude of the energy of an incident radiation.

17. The method for calibrating a spectrometer (15), wherein a spectrometry method according to claim 2 is used, and wherein the following additional steps are carried out:

d) comparing said reference ionising-radiation energies $E_i(REF)$ determined in step c) with the corresponding energies $E_i(mes)$ measured by said spectrometer (15) in an energy spectrum of the ionising radiation, in order to obtain an error value associated with each ionising-radiation energy measurement, said error value being a measurement of a discrepancy between the energy $E_i(mes)$ measured by said spectrometer (15) and the corresponding reference energy $E_i(REF)$ determined in step c), and e) when a plurality of error values are nonzero and in absolute value higher than threshold values, determining an energy correction to be made permanently to each energy $E_i(mes)$ measured by the spectrometer (15).

18. The method for calibrating a spectrometer (15), wherein a spectrometry method according to claim 3 is used, and wherein the following additional steps are carried out:

d) comparing said reference ionising-radiation energies $E_i(REF)$ determined in step c) with the corresponding energies $E_i(mes)$ measured by said spectrometer (15) in an energy spectrum of the ionising radiation, in order to obtain an error value associated with each ionising-radiation energy measurement, said error value being a measurement of a discrepancy between the energy $E_i(mes)$ measured by said spectrometer (15) and the corresponding reference energy $E_i(REF)$ determined in step c), and e) when a plurality of error values are nonzero and in absolute value higher than threshold values, determining an energy correction to be made permanently to each energy $E_i(mes)$ measured by the spectrometer (15).

19. The method for calibrating a spectrometer (15), wherein a spectrometry method according to claim 4 is used, and wherein the following additional steps are carried out:

d) comparing said reference ionising-radiation energies $E_i(REF)$ determined in step c) with the corresponding energies $E_i(mes)$ measured by said spectrometer (15) in an energy spectrum of the ionising radiation, in order to obtain an error value associated with each ionising-radiation energy measurement, said error value being a measurement of a discrepancy between the energy $E_i(mes)$ measured by said spectrometer (15) and the corresponding reference energy $E_i(REF)$ determined in step c), and e) when a plurality of error values are nonzero and in absolute value higher than threshold values, determining an energy correction to be made permanently to each energy $E_i(mes)$ measured by the spectrometer (15).

20. The method for calibrating a spectrometer (15), wherein a spectrometry method according to claim 5 is used, and wherein the following additional steps are carried out:

d) comparing said reference ionising-radiation energies $E_i(REF)$ determined in step c) with the corresponding energies $E_i(mes)$ measured by said spectrometer (15) in an energy spectrum of the ionising radiation, in order to obtain an error value associated with each ionising-radiation energy measurement, said error value being a measurement of a discrepancy between the energy $E_i(mes)$ measured by said spectrometer (15) and the corresponding reference energy $E_i(REF)$ determined in step c), and e) when a plurality of error values are nonzero and in absolute value higher than threshold values, determining an energy correction to be made permanently to each energy $E_i(mes)$ measured by the spectrometer (15).

* * * * *